(12) United States Patent
Schindler

(10) Patent No.: US 7,036,233 B1
(45) Date of Patent: May 2, 2006

(54) PIVOT LINKAGE INCLUDING A NON-CONTACT, ROTATIONAL ANGLE MEASUREMENT SENSOR FOR HEAVY MACHINERY

(75) Inventor: Michael P. Schindler, Florence, WI (US)

(73) Assignee: Oldenburg Group, Inc., Glendale, WI (US)

( * ) Notice: Subject to any disclaimer, the term of this patent is extended or adjusted under 35 U.S.C. 154(b) by 0 days.

(21) Appl. No.: 10/949,774

(22) Filed: Sep. 25, 2004

Related U.S. Application Data

(60) Provisional application No. 60/611,785, filed on Sep. 21, 2004.

(51) Int. Cl.
*G01B 7/31* (2006.01)

(52) U.S. Cl. .................................... 33/1 PT
(58) Field of Classification Search ............ 33/1 N, 33/1 PT, 534, 788, DIG. 1; 338/12, 128
See application file for complete search history.

(56) References Cited

U.S. PATENT DOCUMENTS

| | | | | |
|---|---|---|---|---|
| 5,712,478 A | * | 1/1998 | Olsson | 250/231.13 |
| 5,831,554 A | * | 11/1998 | Hedayat et al. | 345/161 |
| 6,361,269 B1 | | 3/2002 | Cooper | |
| 6,568,696 B1 | * | 5/2003 | Osborn et al. | 280/93.5 |
| 6,879,240 B1 | * | 4/2005 | Kruse | 338/12 |
| 2002/0005314 A1 | * | 1/2002 | Takehara et al. | 180/443 |
| 2002/0035877 A1 | * | 3/2002 | Tokumoto | 73/862.333 |
| 2002/0039025 A1 | * | 4/2002 | Shiba | 324/318 |
| 2005/0039548 A1 | * | 2/2005 | Islam et al. | 73/862.334 |

OTHER PUBLICATIONS

Application Note Contactless Angle Measurement using KMZ41 and UZZ9000, *Philips Semiconductors*, 2000.

* cited by examiner

*Primary Examiner*—G. Bradley Bennett
(74) *Attorney, Agent, or Firm*—Reinhart Boerner Van Deuren s.c.

(57) ABSTRACT

A pivot linkage including a non-contact, rotational angle measurement magnetoresistive sensor for interconnecting first and second rotating components of heavy equipment or machinery, the pivot joint linkage, including a ball joint or a cylindrical pin joint and the like. The sensor uses includes a permanent magnet incorporated into one portion of the joint for producing a magnetic field and a magnetoresistive sensor incorporated into the other portion of the joint for detecting changes in the direction of the magnetic field in response to relative rotation between the two rotating component.

19 Claims, 4 Drawing Sheets

PIVOT LINKAGE INCLUDING A NON-CONTACT, ROTATIONAL ANGLE MEASUREMENT SENSOR FOR HEAVY MACHINERY

CROSS-REFERENCE TO RELATED APPLICATION

This application claims priority of provisional application Ser. No. 60/611,785, filed on Sep. 21, 2004, which is entitled "Computer Controlled Continuous Haulage Machine", which application is incorporated herein by reference.

BACKGROUND OF THE INVENTION

Field of the Invention

The present invention relates generally to sensors, and more particularly to a pivot linkage including a non-contact, rotational angle measurement sensor for heavy machinery.

Various types of angle measurement sensors are known. Conventional angle measurement sensors are susceptible to wear, and as such can be characterized as being of limited life. Moreover, known angle measurement sensors are intolerant of movements in directions other than angular movement. Thus, known angle measurement sensors do not have degree of freedom as to movement that does not include the angle being measured. For example, a conventional angle measurement sensor, such as a potentiometer or optical sensor, does not allow linear movement in any direction without affecting the angle being measured. In addition, such linear movement often results in damage to the sensor.

Angle measurement sensors that incorporate potentiometers as the sensing component are susceptible to mechanical tolerances. Typical carbon film, metal film and wire-wound potentiometers also have a limited life time due to being contact type angle measurement sensors.

In applications for heavy equipment, there may be relatively large tolerances between mating components, commonly referred to a sloppy joint. Most known sensors do not allow for relative linear movement between components for which the angle is being measured.

It is accordingly the primary objective of the present invention that it provide an improved pivot linkage including a pivot linkage for a non-contact, rotational angle measurement sensor for heavy equipment.

It is another objective of the present invention that it provide an improved a pivot linkage including an angle measurement sensor that allows for relative linear movement between components for which the rotational angle is being measured.

A further objective of the present invention is that it provide an improved pivot linkage including a rotational angle measurement sensor for heavy machinery that is low in cost, easy to install and low maintenance device.

The a pivot linkage including a rotational angle measurement sensor of the present invention must also be of construction which is both durable and long lasting, and it should also require little or no maintenance to be provided by the user throughout its operating lifetime. In order to enhance the market appeal of the apparatus of the present invention, it should also be of inexpensive construction to thereby afford it the broadest possible market. Finally, it is also an objective that all of the aforesaid advantages and objectives be achieved without incurring any substantial relative disadvantage.

SUMMARY OF THE INVENTION

The disadvantages and limitations of the background art discussed above are overcome by the present invention. With this invention, there is provided a pivot linkage including a non-contact, rotational angle measurement sensor for measuring the rotational angle between first and second rotating components of heavy equipment or machinery. The pivot linkage sensor provided by the present invention can be used to measure the angle between two moving components that are interconnected by the pivot joint linkage. By way of example, the angle measurement sensor of the a pivot linkage can be used to measure the angle between first and second components that are rotatably coupled together by a ball joint or a cylindrical pin joint and the like for rotation with respect to one another. The angle measurement sensor is non-contact device that allows infinite degrees of freedom of the joint without affecting the rotational angle that is being measured.

The angle measurement sensor of the pivot linkage uses the magnetoresistive effect in measuring the angle between rotating components. The angle measurement sensor includes one or more permanent magnets for producing a magnetic field and a magnetoresistive sensing circuit for detecting changes in the direction of the magnetic field in response to relative rotation between the two rotating components. The permanent magnets are incorporated into one member of the pivot linkage that is coupled to a rotating components of the machinery and the sensor and associated signal conditioning circuits are incorporated into another member of the pivot linkage that is coupled to the other moving component of the machinery. This system of angle measurement allows up to 0.5 inch gap between the magnetoresistive sensing circuit and the permanent magnets, without affecting the accuracy of the measurement.

The angle measurement sensor has a high degree of accuracy, greater than 0.1 degrees rotation. The angle measurement sensor has a measurement range of about 180°. Preferably, the angle measurement sensor produces an analog output signal in the range of about 4 to 20 mA that is proportional to the angle being measured. However, the angle measurement sensor is also capable of producing other standard output signals, such as a 0 to 5 Volt signal or a 0–10 Volt analog signal.

The angle measurement sensor is a non-exposed, integral part of the mechanical joint linkage that couples together two moving parts, the rotational angle of which is to be measured. The angle measurement sensor and its associated electronics can be hermetically sealed and the housing of the angle measurement sensor can be made from non-corrosive metals. Thus, the angle measurement sensor can operate while immersed in grease, oil or water. Moreover, the non-contact angle measurement sensor has no moving parts or wear items. Consequently, the angle measurement sensor is an extremely long life angle measurement sensor.

In contrast to conventional angle measurement sensors, such as potentiometers that are susceptible to mechanical tolerances, the novel non-contact angle measurement sensor provided by the present invention allows a large degree of mechanical tolerance.

Moreover, typical carbon film, metal film and wire wound potentiometers used as sensors have a limited life time due to them being contact type angle measurement sensors. In contrast, the non-contact design angle measurement sensor provided by the present invention is a solid state device and has no wear parts and therefore has a much longer life.

It may therefore be seen that the present invention teaches a pivot linkage including a non-contact, rotation angle measurement sensor for measuring the rotational angle between first and second rotating components of a heavy equipment that are interconnected by the mechanical pivot linkage.

The pivot linkage including the rotational angle measurement sensor is of a construction which is both durable and long lasting, and which will require little or no maintenance to be provided by the user throughout its operating lifetime. The pivot linkage including the angle measurement sensor of the present invention is of inexpensive construction to enhance its market appeal and to thereby afford it the broadest possible market. Finally, all of the aforesaid advantages and objectives are achieved without incurring any substantial relative disadvantage.

DESCRIPTION OF THE DRAWINGS

These and other advantages of the present invention are best understood with reference to the drawings, in which.

DETAILED DESCRIPTION OF THE PREFERRED EMBODIMENT

Figure 1:
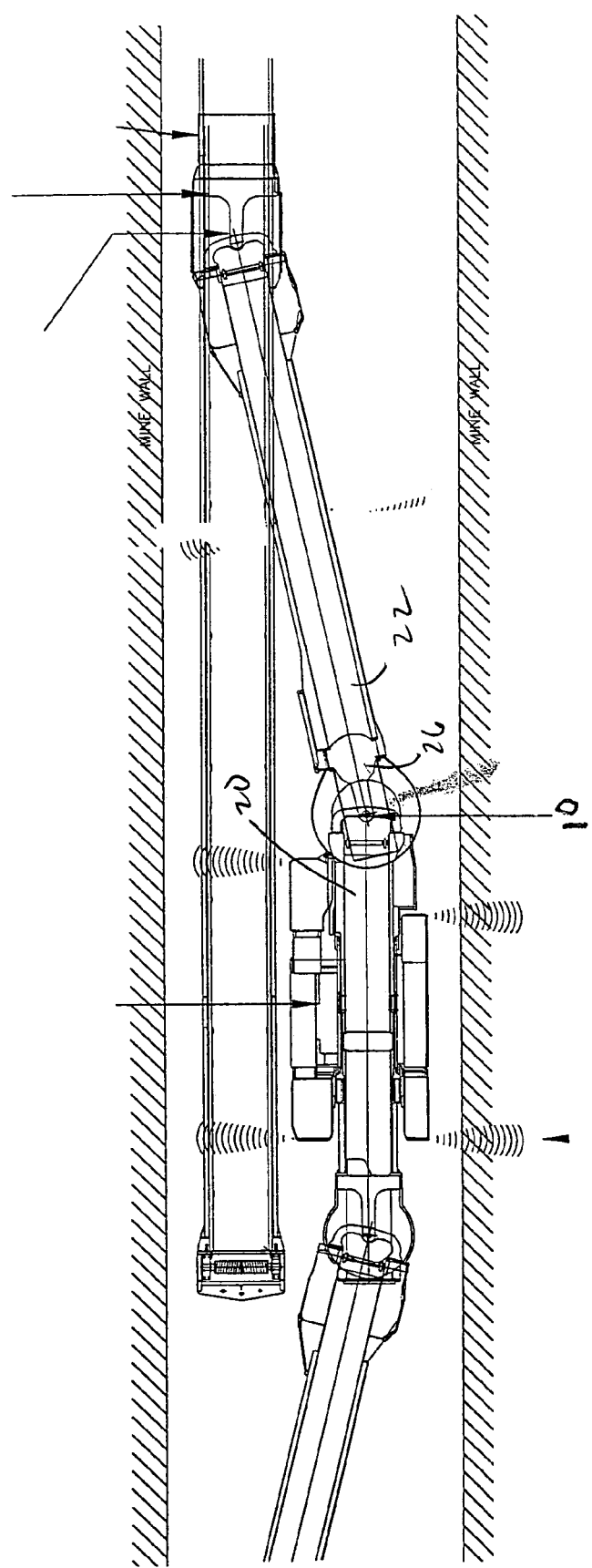
FIG. 1 is a top plan view of a heavy duty machine incorporating a pivot linkage including a non-contact rotational angle measurement sensor provided by the present invention, the machine shown located within a passage of an underground mine.
Figure 3:
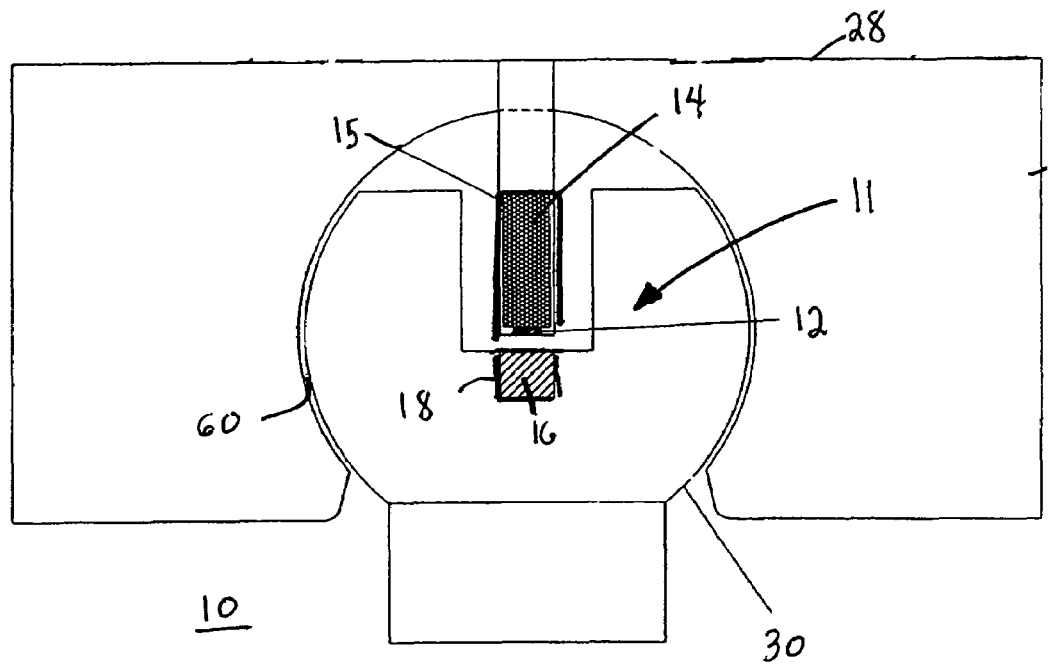
FIG. 3 is a simplified representation showing an embodiment of the pivot linkage including a ball joint with the non-contact rotational angle measurement sensor incorporated into the ball joint.

Referring to FIGS. 1 and 3 of the drawings, the pivot linkage 10 including a non-contact, rotational angle measurement sensor 11 provided by the present invention is described with reference to an application for measuring the angle between, and thus the angular position of, first and second components of a mechanical linkage joint of heavy machinery. By way of example, the mechanical linkage joint 10 can be that between a mobile vehicle (MBM) 20 of a continuous hauler machine of the type used in underground mining applications and a conveyor unit (CBM) 22 that is coupled to and moves along with the mobile vehicle 20. The continuous hauler machine can be that disclosed in copending application Ser. No. 10/950,042, of Michael P. Schindler and Stephen A. Rudinec, which was filed on Sep. 25, 2004, and which is entitled "Computer Controller Continuous Haulage Machine", which application is incorporated herein by reference. However, the mechanical linkage joint including a rotational angle measurement sensor can be used in other types of heavy machinery.

Figure 2:
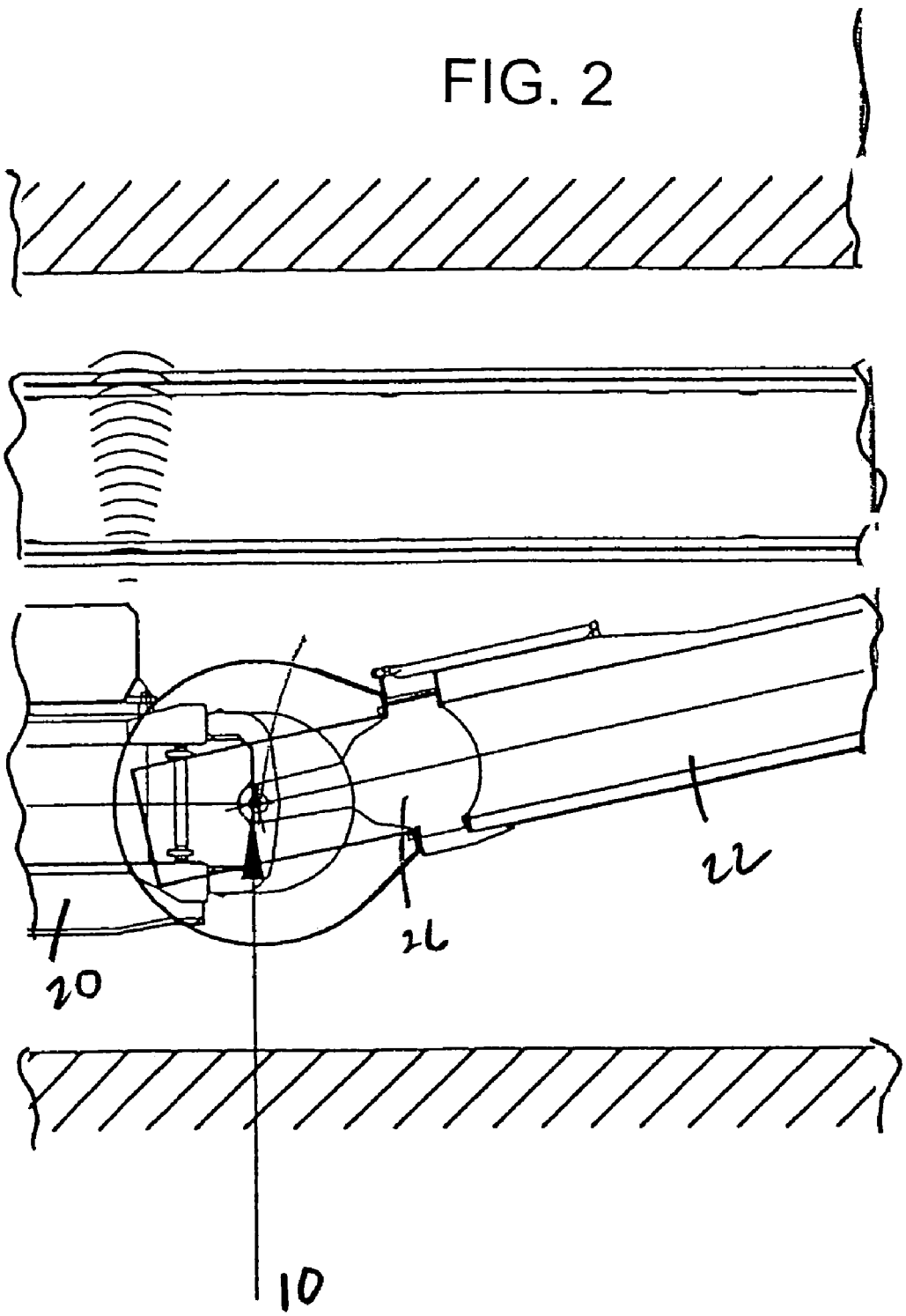
FIG. 2 is an enlarged fragmentary view of a portion of the machine of FIG. 1 showing the pivot joint linkage incorporating the non-contact rotational angle measurement sensor provided by the present invention.

One end 26 of the CBM 22 is supported by and coupled to the MBM 20 and the CBM 22 is articulated to the MBM 20 by the pivot joint linkage 10. By way of example, the pivot joint linkage 10 can be a ball and socket type joint linkage. Referring also to FIGS. 2 and 3, the rotational measurement angle sensor 11 is incorporated into the ball and socket joint linkage 10. FIG. 3 is a simplified representation showing the use of the non-contact rotational sensor 11 for sensing angular of rotation of components of a heavy duty machine that are coupled together by the ball joint 10. The rotational angle sensor 11 includes a sensing component 12 that is incorporated into the socket 28 of the ball and socket joint linkage 10 and a magnetic field producing component 16 that is incorporated into the ball 30 of the ball and socket joint linkage 10. The ball 30 is located on an upper surface of the MBM 20 and the socket 28 is carried on a lower surface of the CBM 22 that is disposed to overlie and mate with the ball 30 when the CMB 22 is coupled to the MBM 20. In this application, the permanent magnets 16 are mounted in the ball 30 carried by the MBM 20. The magnets 16 are held in place by a magnet holder 18. The magnet holder 18 is self-contained and the magnet holder containing the permanent magnets is adapted to be inserted into a recess 19 in the ball 30 as a unit. The sensing component 12 is mounted in the socket 28 carried by the CBM 22. However, the sensing component 12 can be mounted in the ball 30 and the permanent magnets 16 can be mounted in the socket 28. Alternatively, the pivot joint linkage can be a pin and socket type linkage, such as the pin and socket linkage shown in FIG. 4.

Figure 4:
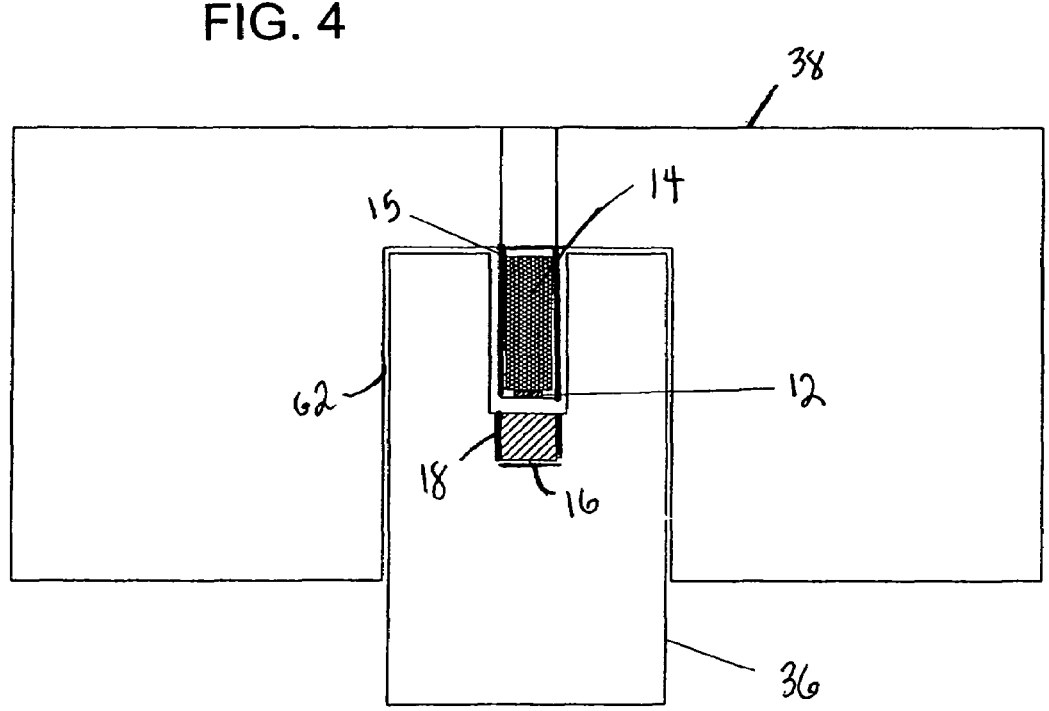
FIG. 4 is a simplified representation showing an alternative of the pivot linkage including a pin joint with the non-contact rotational angle measurement sensor incorporated into the pin joint.

FIG. 4 is a simplified representation showing the use of the non-contact rotational sensor 11 for sensing angular rotation of components of a heavy duty machine that are coupled together by a pin joint. In this application, the permanent magnets 16 are mounted in the pin 36 carried by the MBM 20. The sensing component 12 is mounted in the socket 38 carried by the CBM 22. However, the sensing component 12 can be mounted in the pin 36 and the permanent magnets 16 can be mounted in the socket 38.

Figure 6:
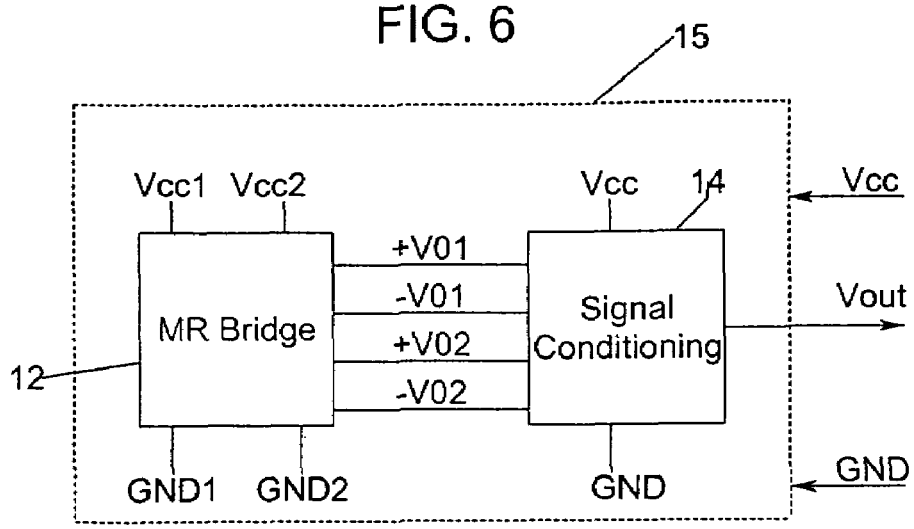
FIG. 6 is a block diagram of the magnetoresistive sensor and signal conditioning circuits of the non-contact, rotational angle measurement sensor of FIG. 5.
Figure 5:
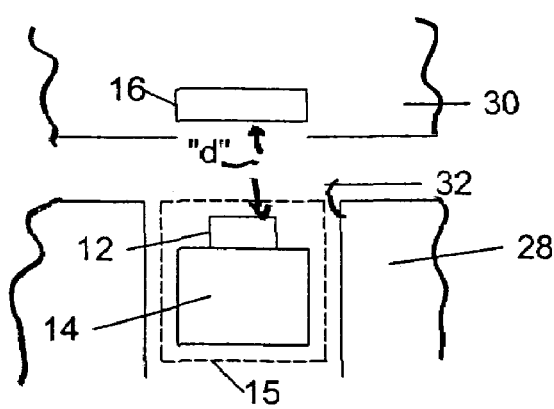
FIG. 5 is a simplified representation of the arrangement of a magnetoresistive sensor and permanent magnets of the non-contact, rotational angle measurement sensor provided by the present invention.

Referring to FIGS. 5 and 6, in a preferred embodiment, the rotational angle measurement sensor 11 is a magnetoresistive type sensing device. The rotational angle measurement sensor 11 includes a magnetoresistive sensor as the sensing component 12, signal conditioning circuits 14 and one or more permanent magnets as the magnetic field producing component 16. The magnetoresistive sensor 12 measures the direction of a magnetic field produced the permanent magnets 16. A correct measurement can be obtained as long as the separation "d" (FIG. 3) between the magnetoresistive sensor 12 and the magnets 16 is less than a preselected value. The permanent magnets 16 and the magnetoresistive sensor can have any relative orientation while the magnetoresistive sensor 12 continues to measure the angle between the permanent magnets 16 and the magnetoresistive sensor. Moreover, the magnetoresistive sensor 12 can accurately measure angle even if any type of material, other than a ferrous material, is placed between the permanent magnets 16 and the magnetoresistive sensor 12. Thus, any type of liquid, gas or solid can be placed between the sensor and the magnet without affecting the angle measurement. Preferably, all of the components of the angle measurement sensor 12 are contained within the mechanical linkage joint 10 which is coupled to the components of the heavy machinery the angle of which is being measured.

Referring to FIG. 5, there is shown a simplified representation of the non-contact rotational angle measurement sensor 11. The angle measurement sensor includes a magnetoresistive sensor 12, signal conditioning circuits 14, shown in FIG. 6, and one or more permanent magnets 16, shown in FIG. 7. More specifically, the magnetoresistive sensor 12 and signal conditioning circuits 14 can be formed as integrated circuit components contained within a sensor package 15 that is adapted to be located in the linkage portion of one of the components, such as the socket 28. The sensor package 15 can be integrated into a recess 32 formed a projection 33 of the socket 28. The opening to the recess 32 can be sealed after the sensor package 15 has been mounted in the recess 32. The permanent magnets 16 are located on the linkage portion of the other component, such as the ball 30 of the mechanical joint linkage. Preferably, the package including the permanent magnets 16 contained in the magnet holder 18, can be integrated into the ball 30, such as by locating the package containing the permanent magnets 16 in a recess 34 provided in the ball 30. The opening of the recess can be sealed after the magnet holder 18 containing the permanent magnets 16 is seated in the recess 34.

In the exemplary embodiment, a measurement can be obtained as long as the separation "d" (FIG. 5) between the lower surface of the magnetoresistive sensor 12 and the magnets 16 is no more than about one-half inch. Moreover, the rotational angle sensor can provide an accurate measurement even if there is relative mechanical movement between the ball and socket of the two components, as long as the mechanical movement is in a direction other than in the direction of rotation of the components.

As is known, magnetoresistive sensors make use of the fact that the electrical resistance of certain ferromagnetic alloys is influenced by external magnetic fields. The electroresistance of the permalloy strip changes with the angle between the internal magnetization vector in the strip and the vector of electrical current flowing through it. The strong field produced by the permanent magnets 16 saturates the magnetoresistive sensor so that field strength has no impact on the measurement. Only the direction of the field is evaluated. However, in some applications, is possible to use magnets that do not saturate the sensor.

Referring to FIG. 6, in one embodiment, the magnetoresistive sensor 12 includes two Wheatstone bridge circuits that are oriented at an offset angle of 45° with respect to each other. With this configuration, the magnetoresistive sensor 12 has a full measurement range of 180°. The measurement range can be from 0° to 180° or from −90° to +90° degrees, depending on the zero reference that is used. It is pointed out that while the invention is disclosed with reference to an application in which the measurement range is only 180°, a 360° angle measurement range can be obtained by combining two such magnetoresistive angle sensors. Both of the Wheatstone bridge circuits have separate connections for supply voltage.

The magnetoresistive sensor 12 can be contained in a single integrated circuit, with the Wheatstone bridge circuits being produced on a common substrate using thin film technology. The magnetoresistive sensor 12 alone is much smaller than the magnets 16. In one embodiment, the magnetoresistive sensor itself is only 0.1"×0.1"×0.05". However, when the magnetoresistive sensor 12 and the signal conditioning circuits 14 are enclosed within a housing or package 15, shown in FIG. 5, the sensor package 15 is larger than the permanent magnets 16. One magnetoresistive sensor 12 suitable for this application is the type KMZ41 Magnetoresistive Sensor, commercially available from Phlipps Semiconductors.

The signal conditioning circuits 14 convert the signals produced by the magnetoresistive sensor 12 to a usable signal such as 4–20 mA. The signal conditioning circuits 14 process the small amplitude sense signal produced by the magnetoresistive sensor 12, amplifying the sense signal, adjusting the sense signal for gain and offset, and then calculating the angle from the resultant signal. The signal conditioning circuits 14 include a number of integrated circuit components. In one embodiment, the signal conditioning circuits 14 are produced on an integrated circuit (IC) chip that is separate from the magnetoresistive sensor 12. The magnetoresistive sensor 12 and the associated signal conditioning circuits 14 are incorporated onto a single printed circuit board (not shown) that is contained within the package 15.

Referring to FIG. 6, DC electrical power is provided to the sensor package 15 from the system in which the rotating angle measuring sensor 11 is used. The magnetoresistive sensor 12 and the signal conditioning circuits 14 are connected to the system by three leads, including a power lead Vcc, a ground lead or power reference Vgnd, and a sense signal lead Vout.

The signal output produced by the non-contact angle measurement sensor 11 can be a standard industrial output signal, typically 4–20 mA, 0–5V or 0–10V, that can interface with a large number of data collecting devices, such as personal computers (PCs), programmable logic controllers (PLCs) and signal measurement devices, with or without displays, such as data loggers, multimeters and process meters. The signal output is indicative of the angle with respect to a reference zero. For example, the value of the angle can be represented by a percentage of about 5% to 95% of the supply voltage Vcc, representing the normal operating range of maximum and minimum values. One sensor signal conditioning circuit suitable for this application is the type UZZ9000 Sensor Signal Conditioning integrated circuit commercially available from Phlipps Semiconductors.

Figure 7:
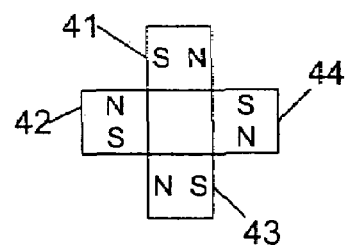
FIG. 7 is a simplified representation of the permanent magnets of the non-contact, rotational angle measurement sensor of FIG. 5.

Referring to FIG. 7, the permanent magnets 16 can include any type of magnet can be used that has a magnetic field strength of greater than 100 kA/m at a distance of about one-half inch from the surface of the magnet. For example, the permanent magnets can be rare earth magnets such as SMCo or NeFeB, for example.

In one embodiment, the permanent magnets 16 include a set of four magnets 41–44 that are arranged in a circle around the magnetoresistive sensor 12. Each of the magnets 41–44 is generally square in shape and has dimensions of 0.5" in width by 0.5" in length by 0.25" in height. The magnets 41–44 are assembled to define a planar surface that is 0.5" in width by 0.5" in length. The magnets 41–44 are disposed with their planar surface 45 overlying the sensor. However, this configuration of magnets 41–44 illustrates one example only, and there are many configurations of magnets that would work, including a single magnet or several magnets.

The set of magnets 41–44 can be positioned in a channel formed in the component, located to overlie the sensing element 12 of the package 15 mounted in the mating component, in the manner of the sensors shown in FIGS. 3 and 4, for example.

Referring again to FIG. 2, there is shown typical component layouts, the angle of which is to be measured. The sensing component of the angle measurement sensor 11 is mounted in or carried by one of the components the angular relationship is to be measured. Preferably, the magnetoresistive sensor 12 is embedded in the component. However, it is apparent that the magnetoresistive sensor 12 can be fixed to the component in other ways. The magnetoresistive sensor 12 can be encapsulated. Similarly, the permanent magnets 16 are mounted in or carried by the other component. Preferably, the permanent magnets 16 can be embedded in the component as original equipment. However, the sensor package 15 can be retrofitted to a machine, the relative angle of which is be measured and/or monitored. For example, a ball joint angle sensor can be installed on an existing machine by replacing the standard ball with a ball that contains the permanent magnets and attaching the package containing the sensor and the signal conditioning electronics.

Figures 8, 9, 10:
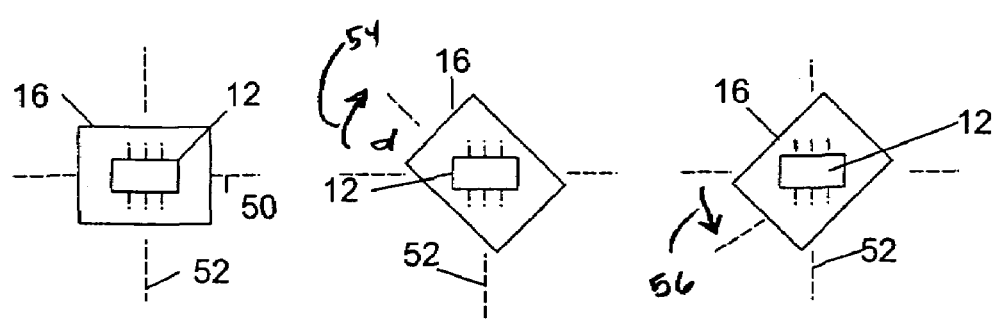
FIGS. 8–10 illustrate the sensing range for the non-contact rotational angle measurement sensor provided by the present invention.

Referring to FIGS. 2 and 8, the zero reference, such as an axis 50 shown in FIG. 8, for the angle measurement sensor 11 can be stored in a memory for comparison with a measured value to determine the relative current angular positions. The angle 0° reference is predetermined and is stored in the memory. Because the CBM 22 can move relative to the MBM 20 and the MBM 20 can move relative to the CBM 22, there is no fixed reference. Accordingly, in the preferred embodiment, the CBM 22 (which carries the sensing component) is chosen as the reference and the angle of the MBM 20 is measured with reference to the CBM 22.

Referring to FIGS. 8–10, in one embodiment, the measurement can be determined over a range of 180° from an initial position which can be a given angular relationship between the two components, the angle α (FIGS. 9 and 10) of which is to be measured. The relative orientation shown in FIG. 8 represents zero rotation. In FIG. 9, the component carrying the permanent magnets 16 has been rotated, relative to axis 50, over an angle α of about +45°. In FIG. 10, the component carrying the permanent magnets 16 has been rotated, relative to axis 50, over an angle α of about −45°. The range is about ±90° with respect to the axis 50. The results of the angle measurement can be used in controlling the operation of the machine with which the components are associated. The angle measurement indicates the position of the conveyor of the CBM 22 relative to the direction of travel of the MBM 20. The sensor output can be used in controlling the drive system for the MBM 20 to change the angular orientation of the CBM 22 relative to the mobile unit MBM 20 to rotate the CMB 22 a desired amount. This angular adjustment can be used in turning corners, for example, or in response to any other need to change the angular orientation of the CBM 22 with respect to the MBM 20. The automated mobile unit continues to operate indefinitely without the need for any human intervention. The automated mobile unit is completely automated and does not require a human operator.

Referring again to FIG. 8, for the initial or zero position, the output signal is maximum. As one of the components is rotated in one direction with respect to the other component, the permanent magnets 16 are moved and the amplitude of the output signal decreases. This decrease is sensed and applied to a controller of the MBM 20. The polarity of the output signal indicates the relative angular position of the components. Referring back to FIG. 1, the magnetoresistive sensor can be used to measure the location of an arm of the machine as indicated by the angle between the two components. The rotational angle measurement sensor 11 can be used as an input to allow driverless operation of the mobile machine 20. A measurement can be obtained as long as the separation "d" (FIG. 3) between the magnetoresistive sensor 12 and the set 40 of permanent magnets is no more than about one-half inch. Moreover, the rotational angle measurement sensor 11 can provide an accurate measurement even if there is relative mechanical movement between the two components, as long as the mechanical movement is in a direction other than in the direction of rotation of the components. Such linear movement is possible because of the gap 60 between the ball and socket (FIG. 3) or the gap 62 between the pin and socket (FIG. 4).

It may therefore be seen from the above detailed description, the pivot linkage couples together rotating components of heavy equipment or machinery and includes a non-contact, rotational angle measurement sensor for measuring the rotational angle between the rotating components, allowing infinite degrees of freedom of the joint without affecting the rotational angle that is being measured.

Although an exemplary embodiment of the present invention has been shown and described with reference to particular embodiments and applications thereof, it will be apparent to those having ordinary skill in the art that a number of changes, modifications, or alterations to the invention as described herein may be made, none of which depart from the spirit or scope of the present invention. All such changes, modifications, and alterations should therefore be seen as being within the scope of the present invention.

What is claimed is:

1. A mechanical pivot linkage for coupling together first and second components of heavy machinery, the pivot linkage allowing relative rotational and linear movement between the first and second components, said mechanical pivot linkage comprising:

a first linkage joint member coupled to said first component;

a second linkage joint member coupled to second component, said second linkage joint member adapted to be mounted on said first linkage joint member in mating engagement with said first linkage joint member, allowing at least relative rotational movement; and a non-contact, rotational angle measurement sensor for measuring the rotational angle between said first and second linkage joint members, and thus, said first and second components, said angle measurement sensor including one or more permanent magnets carried by said first linkage joint member and a magnetoresistive sensor carried by said second linkage joint member, said magnetoresistive sensor having a surface, and said one or more permanent magnets defining a planar surface overlying said surface of said magnetoresistive sensor and spaced apart from said surface of said magnetoresistive sensor, wherein the strength of said one or more permanent magnets and the spacing "d" between the planar surface of the permanent magnets and the surface of the magnetoresistive sensor are selected to produce a magnetic field that causes said magnetoresistive sensor to operate in a saturated condition, so that said non-contact, rotational angle measurement sensor detects only changes in the direction of the magnetic field strength, indicative of relative rotational movement between the first and second components, while remaining insensitive to relative linear movement between said first and second components.

2. The pivot linkage according to claim 1, wherein said magnetoresistive sensor is integrated into said second linkage joint member.

3. The pivot linkage according to claim 1, wherein said one or more permanent magnets are integrated into said first linkage joint member.

4. The pivot linkage according to claim 1, wherein said non-contact, rotational angle measurement sensor is insensitive to relative mechanical movement between said first and second components in a direction other than in the direction of rotation of the first and second components.

5. The pivot linkage according to claim 1, wherein said first and second pivot joint members permit relative linear movement between said first and second components in a direction other than in the direction of rotation of the components.

6. The pivot linkage according to claim 1, wherein said first and second linkage joint members form a ball joint.

7. The pivot linkage according to claim 1, wherein said first and second linkage joint members form a pin joint.

8. A mechanical pivot linkage for coupling together first and second components of heavy machinery, the pivot linkage allowing at least relative rotational movement between the first and second components, said mechanical pivot linkage comprising:
  a ball joint including a ball portion and a mating socket portion, said ball portion coupled to said first component and said socket portion coupled to said second component; and
  a non-contact, rotational angle measurement sensor for measuring the rotational angle between said ball and socket portions, and thus, said first and second components, said sensor including a plurality of permanent magnets carried by one of said ball and socket portions and a magnetoresistive sensor carried by the other one of said ball and socket portions, said magnetoresistive sensor having a surface, and said plurality of permanent magnets being disposed in an array defining a planar surface overlying said surface of said magnetoresistive sensor and spaced apart from said surface of said magnetoresistive sensor, wherein the spacing between the remains substantially fixed with relative rotation between said ball and socket portions.

9. The pivot linkage according to claim 8, wherein said plurality of permanent magnets are integrated into one of said ball and socket portions and said magnetoresistive sensor is integrated into the other one of said ball and socket portions.

10. The pivot linkage according to claim 8, wherein said plurality of permanent magnets are integrated into said ball portion and said magnetoresistive sensor is integrated into said socket portion.

11. The pivot linkage according to claim 8, wherein said first linkage joint member and second components are capable of relative linear movement.

12. The pivot linkage according to claim 8, wherein said magnetoresistive sensor measures relative angular movement between said first and second components while remaining insensitive to relative linear movement between said first and second components.

13. The pivot linkage according to claim 8, wherein said first component is mobile bridge module of a continuous hauler apparatus and wherein said second component is a conveyor bridge module of said continuous hauler apparatus.

14. The pivot linkage according to claim 8, wherein said plurality of permanent magnets include a set of four magnets, each generally square in shape, said plurality of magnets being arranged together to define said planar surface.

15. The pivot linkage according to claim 8, wherein said magnetoresistive sensor is configured to have a measurement range of 180°.

16. A method for measuring the rotational angle between first and second components of heavy machinery that are adapted for relative rotational and linear movement, said method comprising:
  providing a mechanical pivot linkage that includes first and second linkage joint members;
  mounting a plurality of permanent magnets to said first linkage joint member of said pivot linkage, said plurality of permanent magnets being arranged together to define a planar surface;
  mounting a magnetoresistive sensor to a second linkage joint member of said pivot linkage, said magnetoresistive sensor having a surface;
  coupling together said first and second components by said mechanical pivot linkage to allow relative rotational and linear movement between said first and second components and with said planar surface defined by said plurality of permanent magnets overlying said surface of said magnetoresistive sensor,
  selecting the strength of said permanent magnets and the spacing "d" between the planar surface of the permanent magnets and the surface of the magnetoresistive sensor to produce a magnetic field that causes said magnetoresistive sensor to operate in a saturated condition, allowing said magnetoresistive sensor to produce an output that varies in correspondence with relative rotation between said first and second components while remaining insensitive to relative linear movement between said first and second components; and
  monitoring the output of said magnetoresistive sensor as the first and second components are rotated.

17. The method according to claim 16, wherein mounting said plurality of permanent magnets to said first joint linkage member includes integrating said plurality of permanent magnets into said first joint linkage member and mounting said magnetoresistive sensor to said second joint linkage member includes integrating said magnetoresistive sensor into said second linkage joint member.

18. The method according to claim 16, wherein said first and second linkage joint members form a ball joint.

19. The method according to claim 16 wherein said first and second linkage joint members form a pin joint component.

* * * * *